Patented June 13, 1933

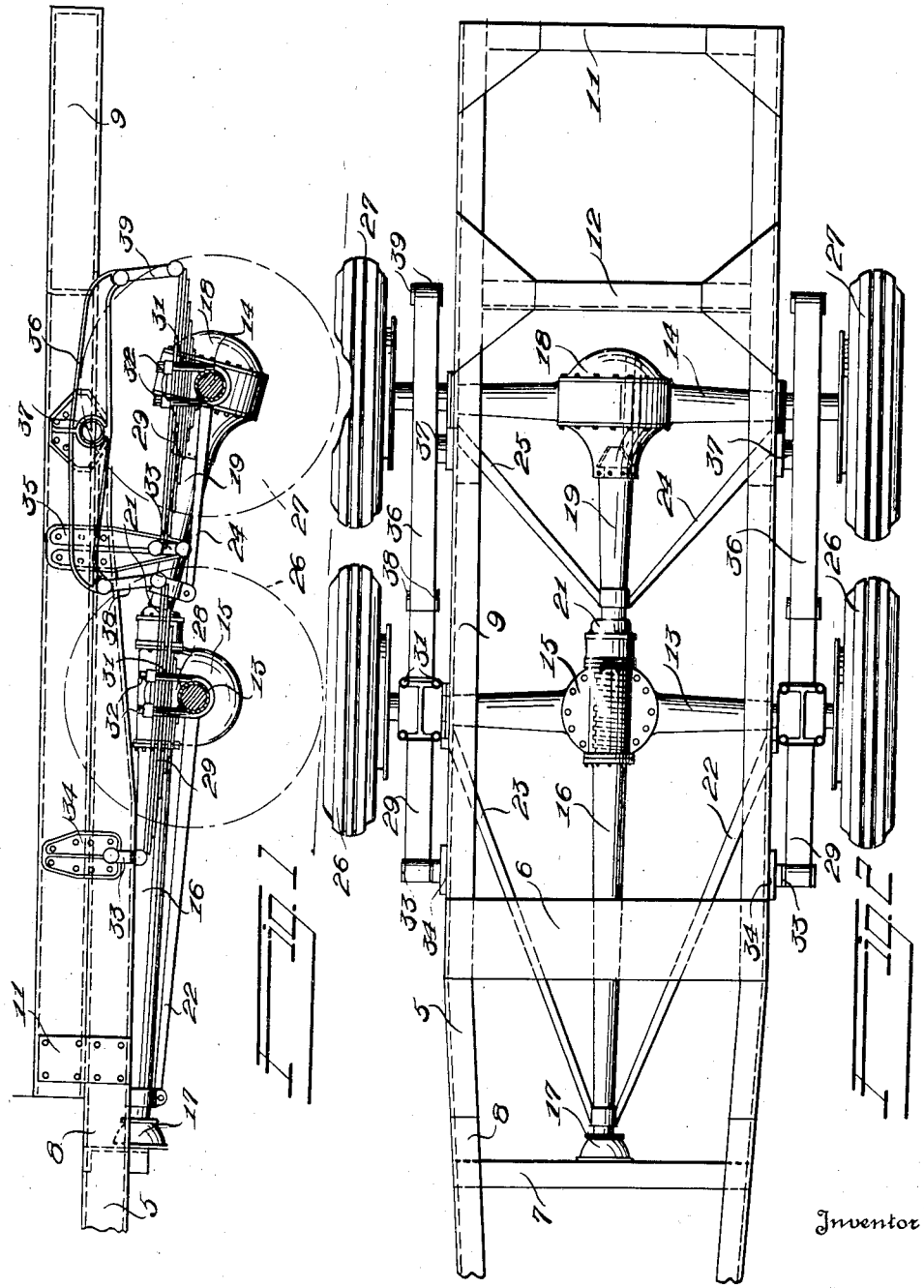

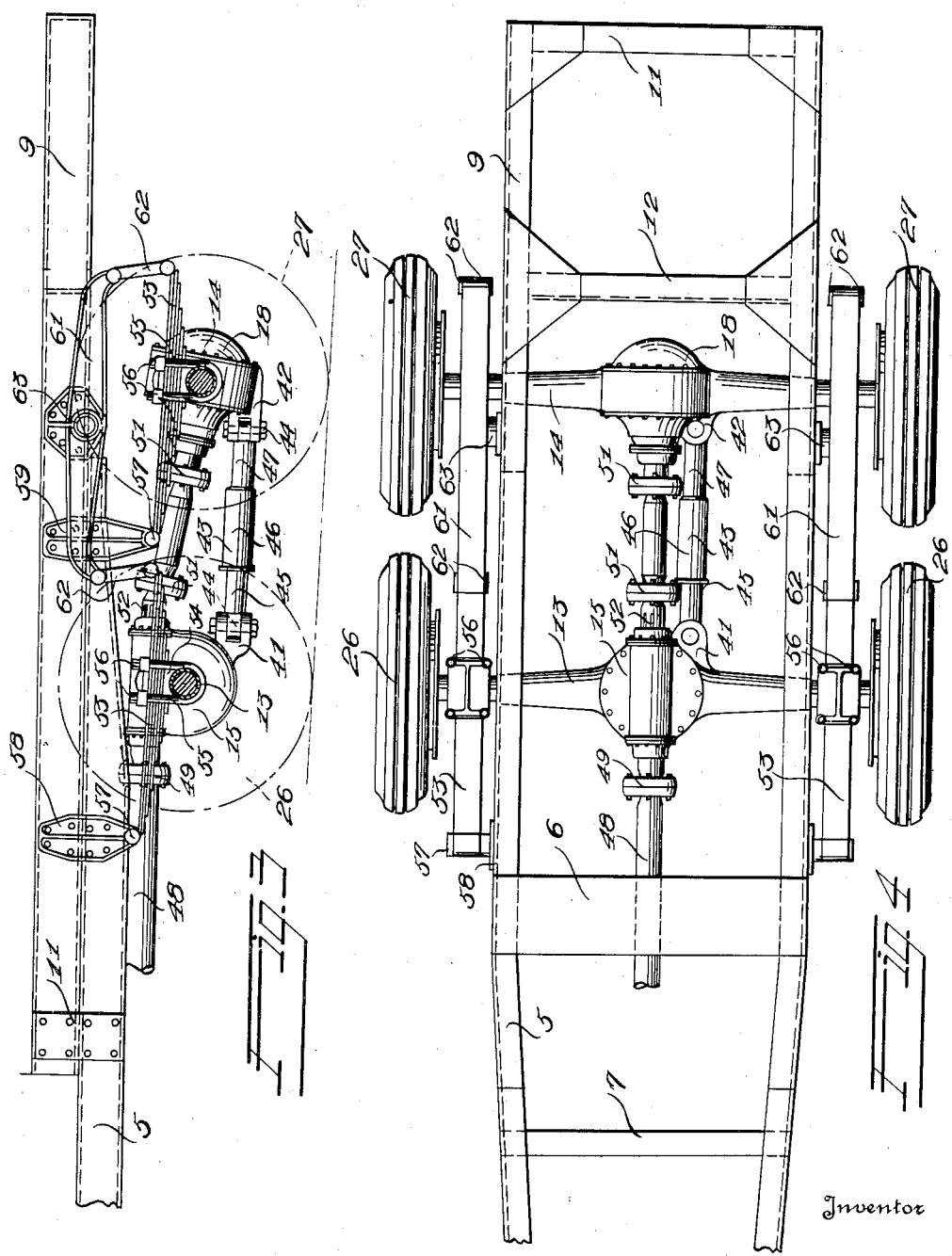

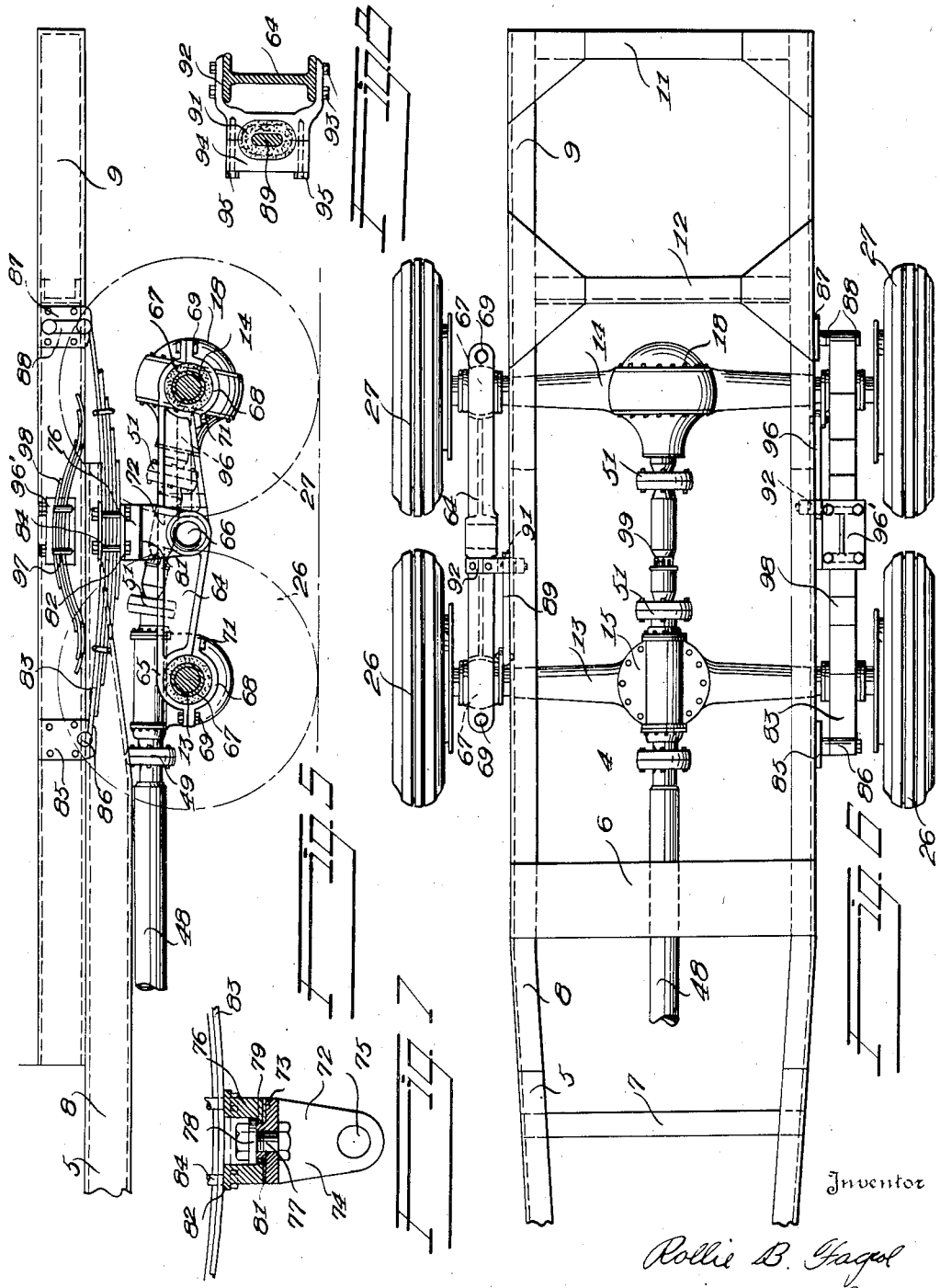

1,913,799

UNITED STATES PATENT OFFICE

ROLLIE B. FAGEOL, OF LOS ANGELES, CALIFORNIA, ASSIGNOR, BY MESNE ASSIGNMENTS, TO AUTOMOTIVE ENGINEERING CORPORATION, A CORPORATION OF DELAWARE

MULTIWHEEL ROAD VEHICLE

Application filed September 27, 1928. Serial No. 308,665.

This invention relates to a road vehicle of the type that includes tandem axles disposed adjacent one end of the vehicle. More particularly the invention relates to vehicle constructions applicable to tandem axle vehicles generally, and particularly adapted for the construction of tandem axle vehicles from an ordinary vehicle, including but a single driven axle having a bevel gear drive disposed adjacent the rear of the chassis, by the addition to the frame of such vehicle of an extension therefor, and by the further addition thereto of a second drive axle suitably interconnected to the frame and to the other axle.

In the construction of multi-wheel road vehicles having tandem driven axles located at the rear thereof by utilizing standard four wheel vehicles in which bevel gear drive axles are utilized to provide a bevel gear drive through the intermediate or forward driven axle to the rear driven axle, special axle constructions must be utilized, such bevel gear through-drive axles require special comparatively expensive constructions that are difficult to adjust. I have discovered that by using a standard bevel gear axle for the rear driven axle of a tandem axle drive, and by providing a standard worm driven type of axle with the same reduction ratio to the axle shafts as is utilized in the bevel gear axle, standard vehicle parts in wide commercial production may be utilized to construct efficient rugged and novel multi-wheel road vehicles. By utilizing tandem axles that are in standard production with the forward or intermediate axle worm driven and the rear axle of each tandem pair of axles driven by bevel gears heavy multiple wheel road vehicles of considerably increased load carrying capacity and improved riding qualities may be produced from standard four wheel vehicle parts at a minimum cost.

Accordingly a primary object of the invention is to provide an extremely simple, practical low cost multi-wheel road vehicle construction, that may be readily applied to the building up of multi-wheel vehicles from ordinary two axle vehicles having bevel gear driven axles by the addition thereto of an extension for the frame and an additional worm driven through-drive axle, utilizing duplicate parts of the vehicle to a large extent.

A further object of the invention is to provide a multi-wheel road vehicle embodying a through-drive worm shaft housed in torque tubes that are flexibly supported at one end and serve to hold the worm and bevel gear axles in properly spaced position, in combination with novel compensating means or suspensions for connecting the axles to the vehicle frame.

A still further object of the invention is to provide a through-drive for a multi-drive axle vehicle, with novel compensating spring suspensions, and torque tubes to separately resist the torque reactions imposed on the housing of each axle, the drive shaft sections being housed within the torque tubes and provided with flexible joints at the points at which the through-drive shaft is flexible, whereby an extremely compact and practical arrangement is provided.

A still further object of the invention is to provide novel spring suspensions for tandem axle vehicles that will yieldingly resist the movement of the several drive axles toward and from the frame, permitted by their connection to the frame while allowing a relatively large range of movement of each axle, including means to equalize or distribute the load on the several axles and to transmit a substantial portion of the shocks to which one axle may be subjected to the other drive axle.

Further objects of the invention will appear as the description thereof proceeds with reference to the accompanying drawings in which.

Figure 1 is a side elevation of the rear portion of a vehicle, the body being omitted and the wheels diagrammatically indicated in outline.

Figure 2 is a top plan view of the construction illustrated in Figure 1.

Figure 3 is a view similar to Figure 1 depicting a modification of the invention.

Figure 4 is a top plan view of the construction illustrated in Figure 3.

Figure 5 is a view similar to Figure 1 depicting a still further modification of the invention.

Figure 6 is a top plan view of the construction illustrated in Figure 5 with parts broken away for the sake of clearness.

Figure 7 is a sectional view disclosing the swivel joint in the spring trunnion block.

Figure 8 is a transverse section through one of the walking beams disclosing the connection of an associated torque arm therewith.

Similar reference characters indicate like parts throughout the several views.

The improved vehicle of this invention is preferably constructed from an ordinary vehicle having only a single worm driven axle by the addition thereto of an extension to the frame and by the further addition of a second bevel gear driven axle, although it will be obvious to those skilled in the art that such a vehicle may be constructed without using a four wheel vehicle as a base construction. As shown in Figures 1 and 2 of the drawings the numeral 5 indicates a portion of the frame of an ordinary vehicle having a single drive axle. Said frame includes transverse members 6 and 7 rigidly secured to longitudinal members 8. The frame just described is extended rearwardly by attaching to each longitudinal member 8 a member 9 that is rigidly secured thereto in any suitable manner, as by lapping a portion of each of members 8 and 9 and securing the lapped portions together by plates 11 and spring attaching brackets hereinafter described. Members 9 are rigidly connected together by transverse members 11 and 12. The parts so far referred to, being all rigidly united together, form an elongated frame for the improved vehicle.

Arranged adjacent the rear end of the frame just described are drive axles 13 and 14. The axle 13 is provided with a housing 15 for the usual differential and for a worm gear to drive said differential. The axle 13 is held in proper position endwise of the frame by a torque tube 16 that is rigidly bolted at one end to the housing 15 and that is connected at its other end by means of a universal joint 17 to the transverse member 7 of the frame 5. The drive shaft for the worm gear included in the housing 15 extends through the tube 16 and is provided with a universal joint, the center of which is approximately coincident with the center of the universal joint 17.

The axle 14 is provided with a housing 18 containing the usual differential and a bevel gear for actuating the same. Axle 14 is held in proper position endwise of the frame by a torque tube 19 that is rigidly bolted at one end to the housing 18 and that is connected at its other end to the housing 15 by means of a universal joint 21. The drive shaft for the axle 13 extends through the housing 15 and continuously through the torque tube 19 to operate the bevel gear that drives the rear axle 14. Said drive shaft is also provided with a universal joint disposed within the universal joint 21 so that the center thereof is approximately coincident with the center of the universal joint 21. It will be observed that due to the combination worm and bevel gear drives tube 19 is normally angularly disposed relative to tube 16.

In order to firmly hold the ends of the axles in proper position endwise of the frame the axle 13 is provided with radius rods 22 and 23 each secured at one end to the axle 13 adjacent an end of the axle. The other end of each of said radius rods is rigidly united in any suitable manner to the torque tube 16 adjacent the universal joint 17 thereof. The ends of the axle 14 are likewise supported against movement endwise of the frame by radius rods 24 and 25 each rigidly secured at one end to the torque tube 19 adjacent the universal joint 21 and at its other end to the axle 14 adjacent an end thereof.

By the arrangement so far described the axle 13 is held from movement endwise of the frame by the torque tube 16 and the radius rods 22 and 23. However, said axle is free to swing in a substantially vertical plane and to tilt with respect to a line passing centrally longitudinally of the frame, this action being permitted by the universal joint 17. Similarly the axle 14 is held from movement toward the axle 13 and endwise of the frame, since the axle 13 itself is prevented from moving in this direction by the torque tube 19 and the radius rods 24 and 25. The universal joint 21 however, permits the axle 14 to swing freely in vertical planes and to tilt with respect to a line passing centrally longitudinally of the frame.

In order to yieldingly resist the movements of the axles 13 and 14 just described and in order that the shocks applied to one axle may be transmitted in part to the other axle, the axles are yieldingly connected to the frame in a manner about to be described. Journalled on the outer end of each of the axles 13 and 14 immediately outward of the connections of radius rods 22, 23, 24, and 25 therewith and inwardly of the wheels 26 and 27 carried thereby is a saddle 28 to which a leaf spring assembly 29 is secured by U-bolts 31, and nuts 32 in such manner that the forward extensions thereof are slightly longer than the rearward extensions thereof. The forward extensions of leaf springs 29 at each side of the vehicle are flexibly connected by means of shackles 33 to brackets 34 and 35 which are bolted to members 8 and 9 of the frame, and which besides forming pivot bearings for the springs assist plates 11 in holding lapped members 8 and 9 in rigid position. If it is desired to convert a Ford truck into a multi-wheel vehicle the spring assemblies 29 may be of the Ford type. Similarly if another type of car is converted into a multi-wheel vehicle, the springs are preferably of the kind that are standard in that type.

In order to equalize the load on the axles and in order that shocks to the springs of one axle may be transmitted in part to the springs of the adjacent axle the spring assemblies 29 at each side of the vehicle are connected together by a lever 36 that is pivoted at 37 to the frame of the vehicle. The ends of said lever are shackled to the rearward extensions of the spring assemblies 29 by means of shackles 38 and 39.

In operation of the form of the invention described, power is transmitted to the drive axles 13 and 14 by means of the continuous drive shaft contained in the torque tubes 16 and 19. The torque reactions imposed on the housings 15 and 18 of said drive axles are resisted by said torque tubes, which also serve the purpose of holding the axles in definite spaced relation endwise of the frame. In view of the universal joints 17 and 21 however, each axle is free to rise and fall or to tilt in vertical planes as the wheels carried thereby pass over irregularities in the road. When irregularities are encountered by the wheels the upward movement of each axle is resisted by the springs 29, the shackle connections of the spring with the frame and lever 36 permitting them to pivot about the axles during their flexing movements in order that destructive road shocks are not transmitted to the torque resisting connections and the drive shaft housed thereby. It will be observed further that when the axle 13 moves in a vertical plane carrying with it the mid portions of the associated spring assemblies 29 the shackles 38 will be carried upwardly. Upward movement of the shackles 38 causes the lever 36 to swing on its pivot 37 transmitting the shock in a downward direction to the companion spring assembly 29 on the same side of the vehicle in a manner that will be readily understood. It will thus be seen that each drive axle is free to move substantially in a vertical plane without causing a corresponding movement of the frame of the vehicle, and that the shocks to a spring that is individual to one axle are transmitted in a reverse direction to the spring that is individual to the other axle and positioned at the same side of the vehicle. Further, in view of the fact, that the flexible joints 21 and 17 in the torque tubes 19 and 16 are coincident with the universal joints in the drive shaft that is housed in these torque tubes, the freedom of the drive axles just referred to is permitted without setting up destructive stresses in the drive shaft or in the torque connections.

A modified form of the invention is disclosed in Figures 3 and 4 in which housings 15 and 18 of axles 13 and 14 respectively are provided with longitudinally alined bifurcated lugs 41 and 42 to which the opposite ends of a telescopic torque tube connection 43 of well known type are pivotally connected by vertical pivot pins 44. Torque member 43 comprises a section 45 pivotally connected to lug 41 on housing 15 slidably and rotatably disposed in a tubular portion 46 of the other section 47 pivotally connected to lug 42 on housing 18. In this form of the invention a flexible propeller shaft 48 is employed for driving the worm gear in housing 15 and the bevel gear in housing 18. Shaft 48 is provided with a universal joint commonly known as a mechanics joint 49 forwardly of housing 15 and a pair of similar joints 51 intermediate axles 13 and 14. Shaft 48 is provided with a splined telescope connection 52 preferably disposed between housing 15 and adjacent joint 51 and also with a splined connection forwardly of joint 49 (not shown). Due to the provision of worm gear and bevel gear drives for axles 13 and 14 respectively the propeller shaft between axles 13 and 14 is inclined to the horizontal plane of the axles.

In order to yieldingly resist movement of axles 13 and 14 toward the vehicle frame the axles are yieldingly connected to the frame by means of spring assemblies 53 each of which at an intermediate point thereof is secured to a saddle 54 by means of U-bolts 55 and nuts 56 with the saddles supporting the spring assemblies journaled adjacent the opposite ends of axles 13 and 14 as indicated in Figure 4. The forward extensions of spring assemblies 53 which are somewhat longer than the rearward extensions are pivotally connected at 57 to brackets 58 and 59 which as in the first form of the invention further serve to hold lapped members 8 and 9 in position by being rigidly bolted thereto. The rearward extensions of springs 53 are flexibly connected to the opposite ends of equalizing levers 61 by means of shackles 62. Levers 61 are pivotally connected intermediate their ends to the vehicle frame in transverse alinement as indicated at 63.

In operation of this form of the invention, power is transmitted to the drive axles 13 and 14 by the respective worm and bevel gears through flexible propeller shaft 48. The torque reactions imposed on housings 15 and 18 are resisted by torque member 43, but which due to its telescopic construction, and the splined connections in shaft 48 permits relative movement between axles 13 and 14 to permit free movement of springs 53 about their pivotal connections 57 upon being deflected so that destructive shocks are not transmitted to any of the parts. When irregularities are encountered by the wheels 26 or 27 the upward movement of either axle 13 or 14 about spring pivotal connections 57 respectively moves the corresponding shackles 62 upwardly, thus rocking levers 61 about their pivotal connections 63 to transmit the shock not absorbed by the springs supported by one axle to the springs supported by the other axle in a downward direction. Either axle is free for vertical oscillation about the pivotal connections 57 of springs 53 with the frame due to the universal joints 49 and 51, splined connections in propeller shaft 48 and telescopic torque member 43, and as one end of either axle 13 or 14 rises due to irregularities encountered by the wheels the vertical pivotal connections between the opposite ends of torque member 43 and axle housings 15 and 18 permits relative movement of axles 13 and 14 toward and away from each other to avoid tortional strains on springs 53. The construction thus provided possesses the necessary freedom of movement for most effective operation.

In Figures 5 to 8 a still further modification of the invention is disclosed in which axles 13 and 14 are connected to the vehicle frame by spring assemblies which are common to the two axles in symmetrical disposition.

In this form of the invention axles 13 and 14 are connected together by a pair of walking beams 64, one disposed at each side of the vehicle adjacent the respective ends of axles 13 and 14. Each walking beam 64 is as indicated in Figure 8 preferably of I-beam formation provided at each end thereof with a semi-circular seating portion 65 and centrally thereof with a trunnion 66 whose center is in a line connecting the centers of seating portions 65.

Each seating portion 65 engages and houses a rubber block 67 of truncated spherical formation provided with a central aperture for receiving the adjacent end of the respective axle 13 or 14 and arcuate plates 68 are detachably secured to seating portions 65 by suitable bolts 69 and 71 for securing blocks 67 on the axles within the opposite ends of beams 64. Axles 13 and 14 by this means connected together for vertical oscillation of one relative to the other permitted by yieldable pivotal connections of beams 64 with the axles through rubber blocks 67.

Pivotally connected to each of the beams 64, through trunnion 66 thereof is a bracket 72 which as clearly shown in Figure 7 comprises a hub portion 73 and ears 74 apertured at 75 for receiving trunnion 66. A spring trunnion block 76 is swivelly connected to bracket 72 by means of a bolt 77 extending through hub portion 73 and a washer 78 positioned in a recess in block 76 in engagement with a shoulder 79 therein, a suitable gasket 81 being interposed between hub 73 and block 76 to reduce wear between the contacting surfaces. Each of the blocks 76 is provided with a spring seat 82 on which the intermediate portion of a spring assembly 83 such as a standard Chevrolet rear truck spring is secured by bolts 84. Accordingly a spring 83 is provided for axles 13 and 14 at each side of the vehicle and each spring is secured centrally thereof to block 76 which in turn is pivotally mounted centrally of axles 13, and 14 and the forward extensions of springs 83 are pivotally connected to brackets 85 secured to the frame as indicated at 86 and the rearward extensions thereof are flexibly connected to brackets 87 secured to the frame by means of shackles 88, the pivotal and shackle connections of the springs with the frame being equally spaced from the central supports of the springs thus providing spring connections between axles 13 and 14 and the frame which due to their symmetrical disposition equally cushion axles 13 and 14.

In order to resist the torque reactions to housings 15 and 18, axle 13 at one end thereof adjacent beam 64 has secured thereto one end of a torque arm 89 whose opposite end projects through a rubber block 91 which is carried by the adjacent beam 64 by a bracket 92 rigidly bolted to the beam as at 93 and a cap 94 detachably secured to bracket 92 by bolts 95 for securely holding block 91 in fixed position. Similarly axle 14 has secured thereto at the opposite end one end of a torque arm 96 whose opposite end engages a rubber block 91 carried by the corresponding beam 64. Thus each axle is provided with a torque arm for resisting the torque reactions to the housings 15 and 18 of the respective axles 13 and 14.

Secured to the frame at each of the opposite sides thereof by means of suitable brackets 96' and U-bolts 97 is an auxiliary over load spring 98 which as shown is preferably bowed oppositely to spring 83 and is normally spaced therefrom but which upon overloads carried by the vehicle is adapted to engage spring 83 to assist the latter spring in yieldably sustaining the load which is borne alone by springs 83 would be apt to seriously endanger same.

The means employed for driving axles 13 and 14 in this form of the invention through the respective worm and bevel gears is substantially the same as that disclosed in the previously described form of the invention and illustrated in Figures 3 and 4 except that propeller shaft 48 is preferably splined at 99 intermediate joints 51 between axles 13 and 14.

It will be noted that in this form of the invention as in the previously described forms the propeller shaft is angularly disposed between axles 13 and 14 due to the respective worm and bevel gear drives.

In accordance with this form of the invention, axles 13 and 14 with beams 64 yieldably connected thereto are bodily capable of vertical movement against the yieldable resistance of springs 83 which movement is permitted by the forward usual splined connection in shaft 48 and universal joint, opposite axles 13 and 14 due to the pivotal connection of trunnions 66 with spring supporting brackets 72 are capable of vertical rocking movements about said trunnions and due to the yieldable connections of beams 64 with the axles 13 and 14 through rubber blocks 67 limited universal yieldable movement is permitted each axle relative to the other axle thus providing a construction in which the axles are capable of sufficient movement induced by irregularities encountered by the wheels carried thereby to prevent destructive strains to the different parts entering into the construction.

While axles 13 and 14 are connected together by the walking beams 64 for bodily movement and rocking movement about trunnions 66 the yieldable rubber connections 67 between the axles and opposite ends of beams 64 permit limited yieldable movement of the axles individually in all directions and the torque reactions on housings 15 and 18 are yieldably resisted by arms 89 and 96 engaging rubber blocks 91 which blocks also permit relative movement between beams 64 and the axles to which they are secured.

By the provision of the swivelled connections between brackets 72 and spring trunnion blocks 76, tortional strains on the springs is avoided when either end of either axle moves vertical due to road irregularities as the slight rotation of bracket 72 upon such vertical movement is not imparted to the associated spring.

By the provision of the auxiliary overload springs 98, springs 83 are relieved upon excessive loads by springs 98 engaging springs 83 to assist in yieldably supporting the load.

From the foregoing disclosure it will be seen that a vehicle construction is provided by the utilization of many standard parts, which is rugged, relatively inexpensive of construction and in which provision is made for the necessary movement of parts as to avoid destructive strains and at the same time provide for the ready yielding of the axles upon road irregularities being encountered by the wheels carried thereby.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:—

1. A multi-wheel road vehicle comprising a frame, a worm driven axle and a bevel gear driven axle disposed adjacent one end of said frame in tandem, a telescoping torque resisting member vertically pivoted to said axles at opposite ends thereof, a flexible through drive shaft operatively connected with said worm driven axle and said bevel gear driven axle, and springs to yieldingly resist the movement of each of said axles toward and from said frame, said drive shaft being flexible to permit free movement of the springs upon deflection thereof.

2. The combination defined in claim 1 in which said drive shaft comprises a horizontal section for driving said worm driven axle and a section extending downwardly from said worm driven axle to said bevel gear driven axle for driving same.

3. In a multiwheel road vehicle, a frame; a pair of drive axle housings comprising a worm drive axle and a bevel gear drive axle disposed in tandem beneath one end of said frame; a through drive arrangement comprising a longitudinal drive shaft extending through said worm drive axle in vertically offset relation to the axis thereof, and then flexibly and angularly extending from said worm drive axle into said bevel gear drive axle; and means interconnecting said axle housings with the frame and with each other, including torque resisting devices which substantially prevent any rotative movement of each axle housing about its axis without a corresponding rotative movement on the part of the other axle housing, whereby excessive angularity in the drive shaft is prevented.

4. In combination in a multiwheel road vehicle, a chassis framework; a pair of axle housings arranged in tandem adjacent the rear end of said framework; a worm drive mounted in the foremost of said tandem housings; a bevel gear drive mounted in the other housing; a centrally disposed drive shaft extending longitudinally of said framework and projecting through said foremost axle housing to actuate said worm drive, said shaft being vertically offset from the axis of said last mentioned housing and terminating at a point closely adjacent the rear side thereof; and a second drive shaft universally coupled to the first mentioned shaft at said point, and projecting rearwardly at an angle into the rear axle housing substantially centrally of the latter to actuate said bevel gear drive.

In testimony whereof I affix my signature.

ROLLIE B. FAGEOL.